(12) United States Patent
Hung et al.

(10) Patent No.: US 10,418,869 B2
(45) Date of Patent: Sep. 17, 2019

(54) ROTOR STRUCTURE OF SYNCHRONOUS RELUCTANCE MOTOR

(71) Applicant: TECO Electric & Machinery Co., Ltd., Taipei (TW)

(72) Inventors: Lian-Shin Hung, Taipei (TW); Hsiang-Chun Chen, Taipei (TW); Ming-Te Ho, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 289 days.

(21) Appl. No.: 15/438,071

(22) Filed: Feb. 21, 2017

(65) Prior Publication Data
US 2018/0183284 A1 Jun. 28, 2018

(30) Foreign Application Priority Data
Dec. 28, 2016 (TW) .............................. 105143611 A (51) Int. Cl.
*H02K 1/22* (2006.01)
*H02K 1/24* (2006.01)
*H02K 19/02* (2006.01)

(52) U.S. Cl.
CPC ......... *H02K 1/246* (2013.01); *H02K 2213/03* (2013.01)

(58) Field of Classification Search
CPC ........................... H02K 1/246; H02K 2213/03
USPC .................................................. 310/216.002
See application file for complete search history.

(56) References Cited

U.S. PATENT DOCUMENTS

| | | | |
|---|---|---|---|
| 8,638,012 B2* | 1/2014 | Moghaddam | H02K 1/246 310/216.057 |
| 9,906,082 B2* | 2/2018 | Papini | H02K 1/246 |
| 9,941,775 B2* | 4/2018 | Fiseni | H02K 29/03 |
| 10,305,336 B2* | 5/2019 | Lange | H02K 1/2766 |
| 2006/0043812 A1* | 3/2006 | Cheong | H01F 13/003 310/156.53 |
| 2012/0074801 A1* | 3/2012 | Brown | H02K 1/2766 310/59 |
| 2016/0308408 A1* | 10/2016 | Ronchetto | H02K 1/22 |
| 2016/0352161 A1* | 12/2016 | Lange | H02K 1/2766 |
| 2017/0222520 A1* | 8/2017 | Repentin | H02K 1/246 |
| 2018/0083520 A1* | 3/2018 | Papini | H02K 21/14 |
| 2018/0183284 A1* | 6/2018 | Hung | H02K 1/246 |
| 2018/0233971 A1* | 8/2018 | Kolehmainen | H02K 19/14 |

(Continued)

*Primary Examiner* — John K Kim
(74) *Attorney, Agent, or Firm* — Muncy, Geissler, Olds & Lowe, P.C.

(57) ABSTRACT

A rotor structure of synchronous reluctance motor which includes at least one rotor sheet is provided in the present invention. The rotor sheet has a center hole and includes a plurality of reluctance units surrounded the center hole. The reluctance units have an inner through-hole pair and an outer through-hole pair. In an inner through hole of the inner through-hole pair and an outer through hole of the outer through-hole pair, an inner tangent extension and an outer tangent extension are extended along a tangent extension direction. Two oblique extensions are extended from the inner tangent extension and the outer tangent extension along a turning direction which is oblique to the tangent extension direction respectively. An oblique included angle of the outer through hole is smaller than an oblique included angle of the inner through hole.

5 Claims, 8 Drawing Sheets

(56) References Cited

U.S. PATENT DOCUMENTS

2019/0157925 A1* 5/2019 Kolehmainen ........ H02K 1/246
2019/0190328 A1* 6/2019 Seo .......................... H02K 1/24

* cited by examiner

ROTOR STRUCTURE OF SYNCHRONOUS RELUCTANCE MOTOR

This application claims the benefit of Taiwan Patent Application Serial No. 105143611, filed Dec. 28, 2016, the subject matter of which is incorporated herein by reference.

BACKGROUND OF INVENTION

1. Field of the Invention

The present invention is related to a rotor structure of a synchronous reluctance motor, and more particularly is related to a rotor structure having an inner through-hole pair and an outer through-hole pair, and the oblique angles of oblique extensions of the inner through-hole pair and the outer through-hole pair are different.

2. Description of the Prior Art

Attending with technology development, motors are widely used in our daily lives. Motors are mainly used in various power and electricity equipment. Such equipment is usually placed in the commercial buildings or factories crowded with people, and thus some environmental safety problems would be induced.

For example, noise issue is always an environmental safety problem to be resolved for the industry. Based on the mechanisms of noise generation, motor noise can be sorted as electromagnetic noise, mechanical vibration noise, and aerodynamic noise, wherein mechanical vibration noise is usually resulted from improper motor torque design, which may generate a larger torque ripple when the motor rotates, or asymmetric reluctance of rotor, which may also result in a larger torque ripple because the rotor may suffer different reluctance at different positions. Accordingly, how to reduce torque ripple to improve vibration noise is a issue in the industry eager to be resolved.

SUMMARY OF THE INVENTION

In view of the aforementioned conventional motor, it is common to have the problem of large torque ripple and loud vibration noise. Accordingly, it is a main object of the present invention to provide a rotor structure of a synchronous reluctance motor, which features the different oblique angles between the oblique extensions of the inner through-hole pair and the outer through-hole pair so as to improve the torque ripple.

In accordance with the aforementioned object, a rotor structure of a synchronous reluctance motor is provided. The rotor structure comprises at least one iron core, each iron core includes a center hole and a core outer edge, and also includes a plurality of reluctance units surrounding the center hole. Each reluctance unit comprises an inner through-hole pair and an outer through-hole pair. The inner through-hole pair comprises a first inner through hole and a second inner through hole. The first inner through hole comprises an inner tangent extension and a first oblique extension. The inner tangent extension is adjacent to the center hole and extends to a first turning portion along a first tangent extension direction. The first tangent extension direction is perpendicular to a radial direction of the iron core. The first oblique extension is extended from the first turning portion along a first turning direction which is oblique to the first tangent extension direction, and a first oblique included angle is formed between the first turning direction and the first tangent extension direction.

The second inner through hole comprises a second inner tangent extension and a second oblique extension. The second inner tangent extension is adjacent to the center hole and extends to a second turning portion along a second tangent extension direction which is opposite to the first tangent extension direction. The second oblique extension is extended from the second turning portion along a second turning direction which is oblique to the second tangent extension direction, and a second oblique included angle is formed between the second turning direction and the second tangent extension direction. The outer through-hole pair comprises a first outer through hole and a second outer through hole. The first outer through hole comprises a first outer tangent extension and a third oblique extension. The first outer tangent extension is away from the center hole and is adjacent to the core outer edge. The first outer tangent extension extends to a third turning portion along the first tangent extension direction. The third oblique extension is extended from the third turning portion along a third turning direction which is oblique to the first tangent extension direction, and a third oblique included angle, which is smaller than the first oblique included angle, is formed between the third turning direction and the first tangent extension direction.

The second outer through hole comprises a second outer tangent extension and a fourth oblique extension. The second outer tangent extension is away from the center hole and is adjacent to the core outer edge. The second outer tangent extension extends to a fourth turning portion along the second tangent extension direction. The fourth oblique extension is extended from the fourth turning portion along a fourth turning direction which is oblique to the second tangent extension direction, and a fourth oblique included angle, which is smaller than the second oblique included angle, is formed between the fourth turning direction and the second tangent extension direction. In addition, the first oblique included angle is identical to the second oblique included angle, and the third oblique included angle is identical to the fourth oblique included angle.

In accordance with an embodiment of the rotor structure of a synchronous reluctance motor of the present invention, the first oblique included angle and the second oblique included angle are ranged between 40 degrees to 55 degrees, and the third oblique included angle and the fourth oblique included angle are ranged between 15 degrees to 30 degrees.

In accordance with an embodiment of the rotor structure of a synchronous reluctance motor of the present invention, the first oblique extension is extended to a first extension portion, the second oblique extension is extended to a second extension portion, the third oblique extension is extended to a third extension portion, the fourth oblique extension is extended to a fourth extension portion. A first distance between the first extension portion and the core outer edge, a second distance between the second extension portion and the core outer edge, a third distance between the third extension portion and the core outer edge, and a fourth distance between the fourth extension portion and the core outer edge are identical.

In accordance with an embodiment of the rotor structure of a synchronous reluctance motor of the present invention, each of the reluctance units further comprises a center through-hole pair, which is aligned between the inner through-hole pair and the outer through-hole pair. The center through-hole pair comprises a first center through hole and a second center through hole. The first center through hole comprises a first center tangent extension and a fifth oblique extension. The first center tangent extension extends to a fifth turning portion along the first tangent extension direction. The fifth oblique extension is extended from the fifth turning portion along a fifth turning direction which is oblique to the first tangent extension direction, and a fifth oblique included angle, which is smaller than the first oblique included angle, is formed between the fifth turning direction and the first tangent extension direction. The second center through hole comprises a second center tangent extension and a sixth oblique extension. The second center tangent extension extends to a sixth turning portion along the second tangent extension direction. The sixth oblique extension is extended from the sixth turning portion along a sixth turning direction which is oblique to the second tangent extension direction, and a sixth oblique included angle, which is smaller than the second oblique included angle, is formed between the sixth turning direction and the second tangent extension direction. In addition, the fifth oblique included angle is identical to the sixth oblique included angle.

In accordance with an embodiment of the rotor structure of a synchronous reluctance motor of the present invention, the fifth oblique included angle and the sixth oblique included angle are greater than the third oblique included angle and the fourth oblique included angle respectively, and are ranged between 30 degrees and 40 degrees.

In accordance with an embodiment of the rotor structure of a synchronous reluctance motor of the present invention, the fifth oblique extension is extended to a fifth extension portion, the sixth oblique extension is extended to a sixth extension portion, and a fifth distance between the fifth extension portion and the core outer edge is identical to a sixth distance between the sixth extension portion and the core outer edge.

By using the rotor structure of a synchronous reluctance motor provided in accordance with the present invention, because the third oblique included angle and the fourth oblique included angle are smaller than the first oblique included angle and the second oblique included angle respectively, torque ripple can be effectively reduced such that the output torque can be enhanced and the noise can be reduced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

There are various embodiments of the rotor structure of a synchronous reluctance motor in accordance with the present invention, which are not repeated hereby. Two preferred embodiments are mentioned in the following paragraph as an example.

Figure 1:
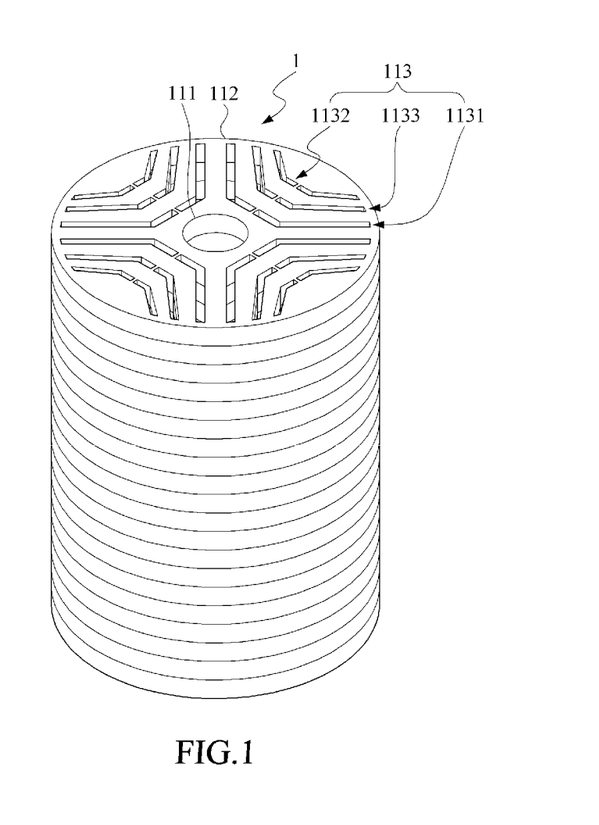
FIG. 1 is a 3D schematic view of the rotor structure of a synchronous reluctance motor provided in accordance with a first embodiment of the present invention.
Figure 2:
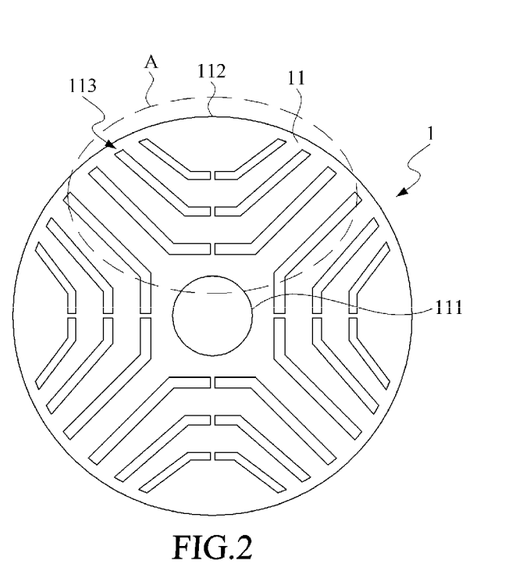
FIG. 2 is a top view of the rotor structure of a synchronous reluctance motor provided in accordance with the first embodiment of the present invention.
Figure 2A:
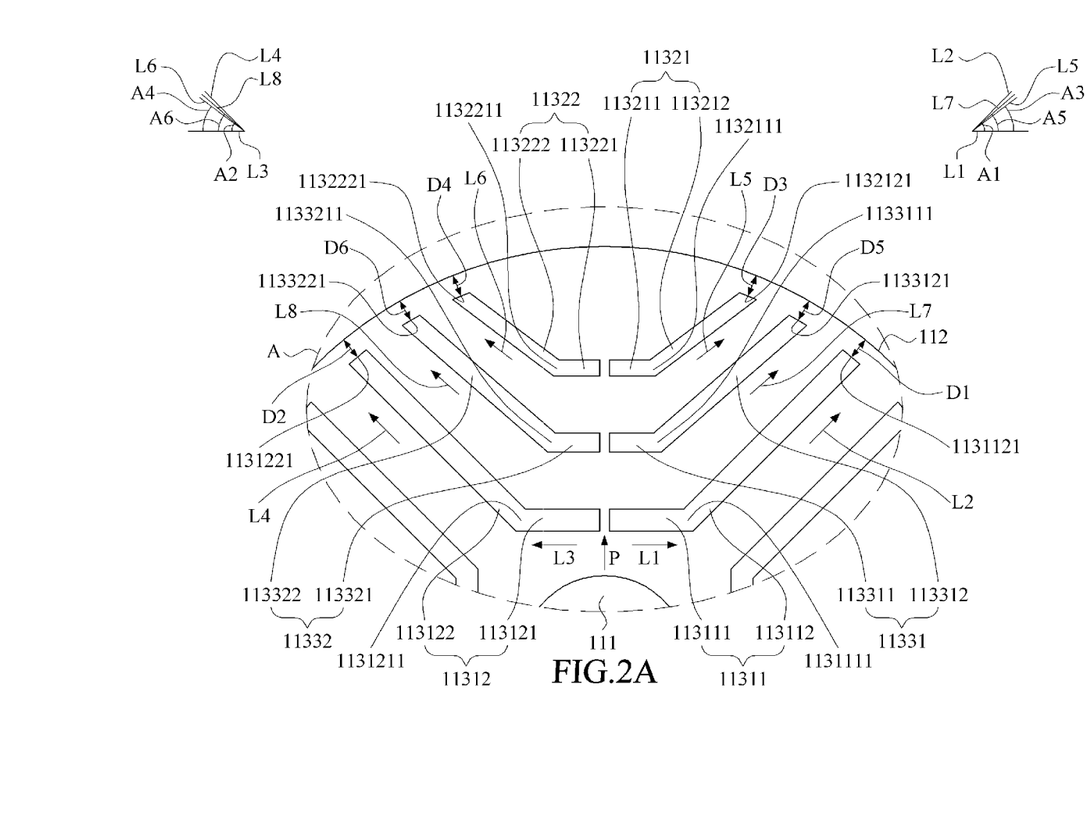
FIG. 2A is an enlarged view of the portion in FIG. 2 marked with the dashed line.

Please refer to FIGS. 1 to 2A, wherein FIG. 1 is a 3D schematic view of the rotor structure of a synchronous reluctance motor provided in accordance with a first embodiment of the present invention, FIG. 2 is a top view of the rotor structure of a synchronous reluctance motor provided in accordance with the first embodiment of the present invention, and FIG. 2A is an enlarged view of the portion in FIG. 2 marked with the dashed line.

As shown, the rotor structure 1 of a synchronous reluctance motor provided in accordance with the preferred embodiment of the present invention comprises at least one iron core 11 (only one of them is labelled), each iron core 11 includes a center hole 111 and a core outer edge 112, and also includes a plurality of reluctance units 113 surrounding the center hole 111. Four symmetrical reluctance units 113 are shown in the present embodiment, however, the present invention is not so restricted.

Each reluctance unit 113 includes an inner through-hole pair 1131, an outer through-hole pair 1132, and a center through-hole pair 1133. The inner through-hole pair 1131 includes a first inner through hole 11311 and a second inner through hole 11312, and the first inner through hole 11311 includes a first inner tangent extension 113111 and a first oblique extension 113112.

The first inner tangent extension 113111 is adjacent to the center hole 111, and is extended to a first turning portion 1131111 along a first tangent extension direction L1, and the first tangent extension direction L1 is perpendicular to a radial direction P of the iron core 11. The first oblique extension 113112 is extended from the first turning portion 1131111 to a first extension portion 1131121 along a first turning direction L2 which is oblique to the first tangent extension direction L1, a first oblique included angle A1 is formed between the first turning direction L2 and the first tangent extension direction L1, and a first distance D1 is left between the first extension portion 1131121 and the core outer edge 112.

The second inner through hole 11312 is spaced apart from the first inner through hole 11311 and includes a second inner tangent extension 113121 and a second oblique extension 113122. The second inner tangent extension 113121 is adjacent to the center hole 111, and is extended to a second turning portion 1131211 along a second tangent extension direction L3 which is opposite to the first tangent extension direction L1. The second oblique extension 113122 is extended from the second turning portion 1131211 to a second extension portion 1131221 along a second turning direction L4 which is oblique to the second tangent extension direction L3, a second oblique included angle A2 is formed between the second turning direction L4 and the second tangent extension direction L3, and a second distance D2 is left between the second extension portion 1131221 and the core outer edge 112.

The outer through-hole pair 1132 includes a first outer through hole 11321 and a second outer through hole 11322. The first outer through hole 11321 includes a first outer tangent extension 113211 and a third oblique extension 113212. The first outer tangent extension 113211 is away from the center hole 111 but is adjacent to the core outer edge 112. The first outer tangent extension 113211 is extended to a third turning portion 1132111 along the first tangent extension direction L1. The third oblique extension 113212 is extended from the third turning portion 1132111 to a third extension portion 1132121 along a third turning direction L5 which is oblique to the first tangent extension direction L1, a third oblique included angle A3 is formed between the third turning direction L5 and the first tangent extension direction L1, the third oblique included angle A3 is smaller than the first oblique included angle A1, and a third distance D3 is left between the third extension portion 1132121 and the core outer edge 112.

The second outer through hole 11322 is spaced apart from the first outer through hole 11321, and includes a second outer tangent extension 113221 and a fourth oblique extension 113222. The second outer tangent extension 113221 is away from the center hole 111 but is adjacent to the core outer edge 112. The second outer tangent extension 113221 is extended to a fourth turning portion 1132211 along the second tangent extension direction L3. The fourth oblique extension 113222 is extended from the fourth turning portion 1132211 to a fourth extension portion 1132221 along a fourth turning direction L6 which is oblique to the second tangent extension direction L3, a fourth oblique included angle A4 is formed between the fourth turning direction L6 and the second tangent extension direction L3, the fourth oblique included angle A4 is smaller than the second oblique included angle A2, and a fourth distance D4 is left between the fourth extension portion 1132221 and the core outer edge 112.

The first oblique included angle A1 is equal to the second oblique included angle A2, the third oblique included angle A3 is equal to the fourth oblique included angle A4, the first oblique included angle and the second oblique included angle A2 are ranged between 40 to 50 degrees, the third oblique included angle A3 and the fourth oblique included angle A4 are ranged between 15 to 30 degrees. However, the present invention is not so restricted. In addition, the first distance D1, the second distance D2, the third distance D3, and the fourth distance D4 are identical. In the present embodiment, the first distance D1, the second distance D2, the third distance D3, and the fourth distance D4 indicate the minimum distances from the first extension portion 1131121, the second extension portion 1131221, the third extension portion 1132121, and the fourth extension 1132221 to the core outer edge 112 respectively.

The center through-hole pair 1133 is aligned between the inner through-hole pair 1131 and the outer through-hole pair 1132, and includes a first center through hole 11331 and a second center through hole 11332. The first center through hole 11331 includes a first center tangent extension 113311 and a fifth oblique extension 113312.

The first center tangent extension 113311 is extended to a fifth turning portion 1133111 along the first tangent extension direction L1. The fifth oblique extension 113312 is extended from the fifth turning portion 1133111 to a fifth extension portion 1133121 along a fifth turning direction L7 which is oblique to the first tangent extension direction L1, a fifth oblique included angle A5 is formed between the fifth turning direction L7 and the first tangent extension direction L1, the fifth oblique included angle A5 is smaller than the first oblique included angle A1, and a fifth distance D5 is left between the fifth extension portion 1133121 and the core outer edge 112.

The second center through hole 11332 is spaced apart from the first center through hole 11331, and includes a second center tangent extension 113321 and a sixth oblique extension 113322. The second center tangent extension 113321 is extended to a sixth turning portion 1133211 along the second tangent extension direction L3. The sixth oblique extension 113322 is extended from the sixth turning portion 1133211 to a sixth extension portion 1133221 along a sixth turning direction L8 which is oblique to the second tangent extension direction L3, a sixth oblique included angle A6 is formed between the sixth turning direction L8 and the second tangent extension direction L3, the sixth oblique included angle A6 is smaller than the second oblique included angle A2, and a sixth distance D6 is left between the sixth extension portion 1133221 and the core outer edge 112.

The fifth oblique included angle A5 is equal to the sixth oblique included angle A6, and is greater than the third oblique included angle A3 and the fourth oblique included angle A4. In the present embodiment, the fifth oblique included angle A5 and the sixth oblique included angle A6 are ranged between 30 to 40 degrees, and the fifth distance D5, the sixth distance D6, the first distance D1, and the second distance D2 are identical. However, the present invention is not so restricted. In addition, it is worth to be mentioned that in the present embodiment, the through-hole pair closer to the core outer edge 112 has a smaller oblique included angle, and the through-hole pair closer to the center hole 111 has a larger oblique included angle. Moreover, it is worth to be mentioned that in accordance with the other embodiments of the present invention, the through-hole pair closer to the core outer edge 112 may be designed to have a larger oblique included angle, and the through-hole pair closer to the center hole 111 may be designed to have a smaller oblique included angle.

In addition, in the present preferred embodiment, the first inner tangent extension 113111, the first oblique extension 113112, the second inner tangent extension 113121, and the second oblique extension 113122 have identical width; the first outer tangent extension 113211, the third oblique extension 113212, the second outer tangent extension 113221, and the fourth oblique extension 113222 have identical width; and the first center tangent extension 113311, the fifth oblique extension 113312, the second center tangent extension 113321, and the sixth oblique extension 113322 have identical width.

In addition, the width of the first inner tangent extension 113111 and the second inner tangent extension 113121 is greater than the width of the first center tangent extension 113311 and the second center tangent extension 113321, the width of the first center tangent extension 113311 and the second center tangent extension 113321 is greater than the width of the first outer tangent extension 113211 and the second outer tangent extension 113221.

In accordance with the other embodiments, the widths of the first inner tangent extension 113111, the second inner tangent extension 113121, the first center tangent extension 113311, the second center tangent extension 113321, the first outer tangent extension 113211, and the second outer tangent extension 113221 may be identical; the widths of the first oblique extension 113112 and the second oblique extension 113122 may be smaller than the widths of the first inner tangent extension 113111 and the second inner tangent extension 113121; the widths of the first outer tangent extension 113211 and the second outer tangent extension 113221 may be smaller than the widths of the third oblique extension 113212 and the fourth oblique extension 113222; the widths of the first center tangent extension 113311 and the second center tangent extension 113321 may be smaller than the widths of the fifth oblique extension 113312 and the sixth oblique extension 113322, but is not restricted to the afore mentioned combination.

Figure 3:
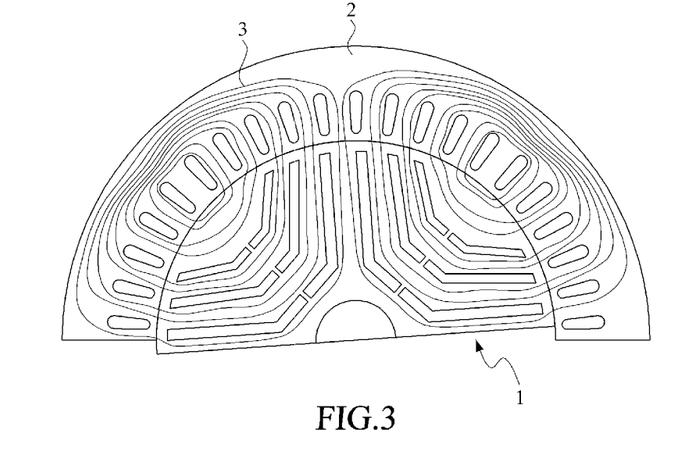
FIG. 3 is a schematic view showing the simulation of magnetic lines of force applied to the stator by using the rotor structure of a synchronous reluctance motor provided in accordance with the first embodiment of the present invention.
Figure 4:
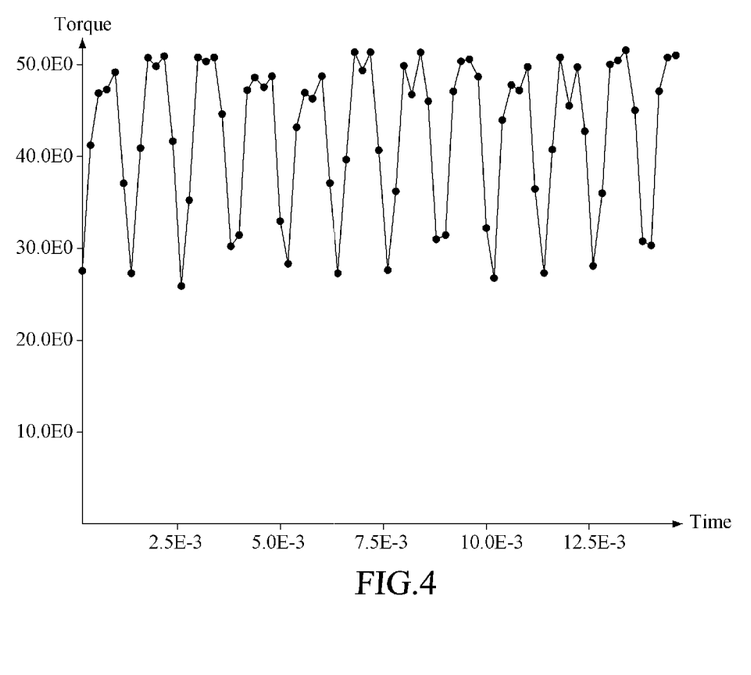
FIG. 4 is a schematic view showing the simulation of torque of the rotor structure of a synchronous reluctance motor provided in accordance with the first embodiment of the present invention.

Please refer to FIGS. 3 and 4, wherein FIG. 3 is a schematic view showing the simulation of magnetic lines of force applied to the stator by using the rotor structure of a synchronous reluctance motor provided in accordance with the first embodiment of the present invention, and FIG. 4 is a schematic view showing the torque simulation of the rotor structure of a synchronous reluctance motor provided in accordance with the first embodiment of the present invention. When placing the rotor structure 1 of the synchronous reluctance motor in the stator 2 to run the simulation, the distribution of the magnetic lines 3 can be accessed, and FIG. 3 shows the operation of the rotor structure 1 of the synchronous reluctance motor in the first second for example.

Figure 5:
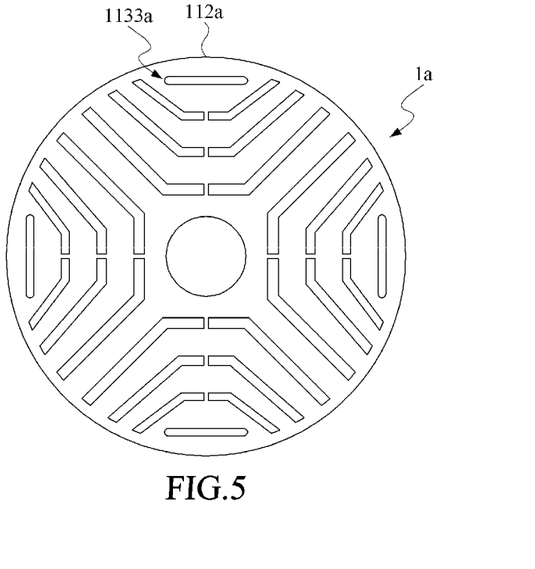
FIG. 5 is a top view of the rotor structure of a synchronous reluctance motor provided in accordance with the second embodiment of the present invention.

Please refer to FIG. 5, which is a top view of the rotor structure of a synchronous reluctance motor provided in accordance with the second embodiment of the present invention. As shown, in compared with the first embodiment of the present invention, the rotor structure 1a of the present embodiment further has the through hole 1133a, which is closer to the core outer edge 112a so as to form the structure with four layers of through holes. The other portion of the present embodiment is identical to the first embodiment, and thus is not repeated here.

Figure 6:
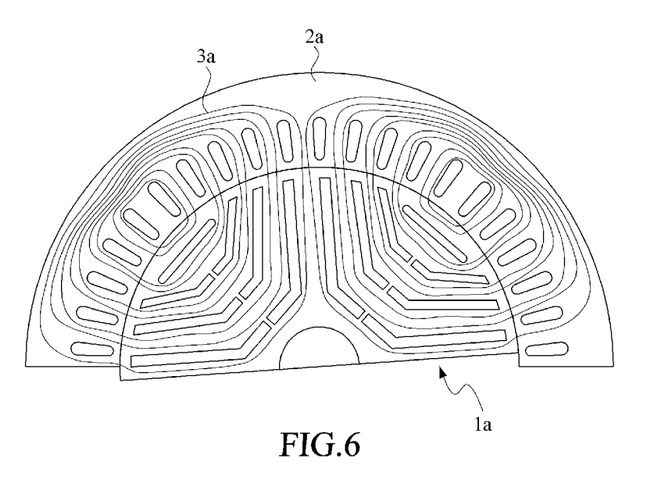
FIG. 6 is a schematic view showing the simulation of magnetic lines of force applied to the stator by using the rotor structure of a synchronous reluctance motor provided in accordance with the second embodiment of the present invention.
Figure 7:
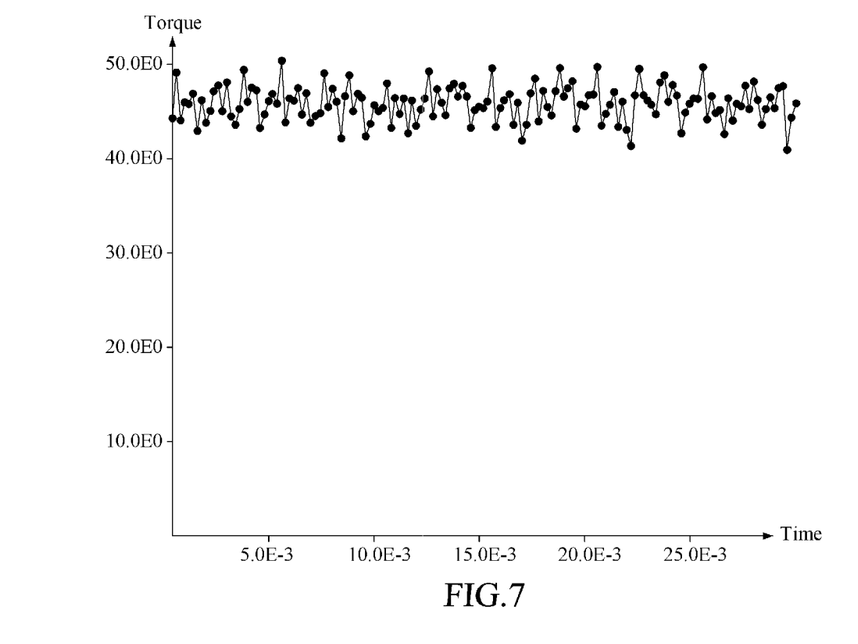
FIG. 7 is a schematic view showing the simulation of torque of the rotor structure of a synchronous reluctance motor provided in accordance with the second embodiment of the present invention

Please refer to FIGS. 6 and 7, wherein FIG. 6 is a schematic view showing the simulation of magnetic lines of force applied to the stator by using the rotor structure of a synchronous reluctance motor provided in accordance with the second embodiment of the present invention, and FIG. 7 is a schematic view showing the simulation of torque of the rotor structure of a synchronous reluctance motor provided in accordance with the second embodiment of the present invention. When placing the rotor structure 1a of the synchronous reluctance motor in the stator 2a to run the simulation, the distribution of the magnetic lines 3a can be accessed, and FIG. 6 shows the operation of the rotor structure 1a of the synchronous reluctance motor in the first second for example. It is found that in compared with the first embodiment of the present invention, the present embodiment has a smaller torque ripple and also an optimized torque output.

In conclusion, by using the rotor structure of a synchronous reluctance motor provided in accordance with the present invention, because the third oblique included angle and the fourth oblique included angle are smaller than the first oblique included angle and the second oblique included angle respectively, torque ripple can be effectively reduced such that the output torque can be enhanced and the noise can be reduced.

While the present invention has been particularly shown and described with reference to a preferred embodiment, it will be understood by those skilled in the art that various changes in form and detail may be without departing from the spirit and scope of the present invention.

What is claimed is:

1. A rotor structure of a synchronous reluctance motor, comprising at least one iron core, each iron core including a center hole and a core outer edge, the iron core also including a plurality of reluctance units surrounding the center hole, and each reluctance unit comprising:

an inner through-hole pair, comprising:
  a first inner through hole, comprising:
    a first inner tangent extension, adjacent to the center hole, extended to a first turning portion along a first tangent extension direction, and the first tangent extension direction being perpendicular to a radial direction of the iron core; and
    a first oblique extension, extended from the first turning portion along a first turning direction which is oblique to the first tangent extension direction, and a first oblique included angle being formed between the first turning direction and the first tangent extension direction;
  wherein the first inner tangent extension and the first oblique extension have an identical width; and
  a second inner through hole, comprising:
    a second inner tangent extension, adjacent to the center hole, and extended to a second turning portion along a second tangent extension direction which is opposite to the first tangent extension direction; and
    a second oblique extension, extended from the second turning portion along a second turning direction which is oblique to the second tangent extension direction, and a second oblique included angle being formed between the second turning direction and the second tangent extension direction;
  wherein the second inner tangent extension and the second oblique extension have an identical width;

an outer through-hole pair, comprising:
  a first outer through hole, comprising:
    a first outer tangent extension, away from the center hole and adjacent to the core outer edge, and extended to a third turning portion along the first tangent extension direction; and
    a third oblique extension, extended from the third turning portion along a third turning direction which is oblique to the first tangent extension direction, and a third oblique included angle, which is smaller than the first oblique included angle, being formed between the third turning direction and the first tangent extension direction;
  wherein the first outer tangent extension and the third oblique extension have an identical width; and
  a second outer through hole, comprising:
    a second outer tangent extension, away from the center hole and adjacent to the core outer edge, and extended to a fourth turning portion along the second tangent extension direction; and
    a fourth oblique extension, extended from the fourth turning portion along a fourth turning direction which is oblique to the second tangent extension direction, and a fourth oblique included angle, which is smaller than the second oblique included angle, being formed between the fourth turning direction and the second tangent extension direction;
  wherein the second outer tangent extension and the fourth oblique extension have an identical width; and a center through-hole pair, aligned between the inner through-hole pair and the outer through-hole pair, and comprising:

a first center through hole, comprising:
> a first center tangent extension, extended to a fifth turning portion along the first tangent extension direction; and
> a fifth oblique extension, extended from the fifth turning portion along a fifth turning direction which is oblique to the first tangent extension direction, and a fifth oblique included angle, which is smaller than the first oblique included angle, being formed between the fifth turning direction and the first tangent extension direction;
> wherein the first center tangent extension and the fifth oblique extension have an identical width; and a second center through hole, comprising:
> a second center tangent extension, extended to a sixth turning portion along the second tangent extension direction; and
> a sixth oblique extension, extended from the sixth turning portion along a sixth turning direction which is oblique to the second tangent extension direction, and a sixth oblique included angle, which is smaller than the second oblique included angle, being formed between the sixth turning direction and the second tangent extension direction;
> wherein the second center tangent extension and the sixth oblique extension have an identical width;

wherein, the first oblique included angle is identical to the second oblique included angle, the third oblique included angle is identical to the fourth oblique included angle, the fifth oblique included angle is identical to the sixth oblique included angle, and the fifth oblique included angle and the sixth oblique included angle are ranged between 30 degrees and 40 degrees.

2. The rotor structure of the synchronous reluctance motor of claim 1, wherein the first oblique included angle and the second oblique included angle are ranged between 40 degrees to 55 degrees, and the third oblique included angle and the fourth oblique included angle are ranged between 15 degrees to 30 degrees.

3. The rotor structure of the synchronous reluctance motor of claim 1, wherein the first oblique extension is extended to a first extension portion, the second oblique extension is extended to a second extension portion, the third oblique extension is extended to a third extension portion, the fourth oblique extension is extended to a fourth extension portion, and a first distance between the first extension portion and the core outer edge, a second distance between the second extension portion and the core outer edge, a third distance between the third extension portion and the core outer edge, and a fourth distance between the fourth extension portion and the core outer edge are identical.

4. The rotor structure of the synchronous reluctance motor of claim 1, wherein the fifth oblique included angle and the sixth oblique included angle are greater than the third oblique included angle and the fourth oblique included angle respectively.

5. The rotor structure of the synchronous reluctance motor of claim 1, wherein the fifth oblique extension is extended to a fifth extension portion, the sixth oblique extension is extended to a sixth extension portion, and a fifth distance between the fifth extension portion and the core outer edge is identical to a sixth distance between the sixth extension portion and the core outer edge.

* * * * *